United States Patent

[11] 3,615,873

[72] Inventors James A. Sluss, Jr.
Hopkinton;
Derek Cregeen, Concord, both of N.H.
[21] Appl. No. 830,156
[22] Filed June 3, 1969
[45] Patented Oct. 26, 1971
[73] Assignee Sprague Electric Company
North Adams, Mass.

[54] METHOD OF STABILIZING MOS DEVICES
5 Claims, No Drawings

[52] U.S. Cl. .......... 148/1.5,
29/571, 117/201, 148/186, 148/187, 317/235
[51] Int. Cl. .......... H01l 7/34
[50] Field of Search .......... 148/1.5,
186, 187, 188, 189; 29/571; 317/235; 117/201

[56] References Cited
UNITED STATES PATENTS

| | | | |
|---|---|---|---|
| 3,183,131 | 5/1965 | Huffman | 148/189 |
| 3,336,661 | 8/1967 | Polinsky | 148/1.5 |
| 3,349,474 | 10/1967 | Rauscher | 148/189 |
| 3,411,199 | 11/1968 | Heiman et al. | 148/187 |

*Primary Examiner*—L. Dewayne Rutledge
*Assistant Examiner*—R. A. Lester
*Attorneys*—Connolly & Hutz, Vincent H. Sweeney, James Paul O'Sullivan and David R. Thornton

ABSTRACT: The electrical properties of an MOS device are improved by subjecting the device, after the oxidation procedure is completed, to an annealing operation in an inert gas ambient. The annealing process is terminated by rapidly removing the device from the annealing ambient and placing it within a lower temperature ambient.

METHOD OF STABILIZING MOS DEVICES

BACKGROUND OF THE INVENTION

This invention relates to stabilizing metal-oxide-silicon (MOS) devices, and in particular to an annealing operation performed during the fabrication of an MOS device for the purpose of improving its stability.

It is well known in the art that when the surface of a silicon wafer is oxidized in a high temperature oxidizing atmosphere, a fixed positive charge develops near the oxide-silicon interface, and it is further known that the presence of mobile sodium ions can add to this fixed charge. This charge, known as the surface state charge, causes the device to become unstable when the mobile sodium ions move under the influence of gate bias. When sodium is essentially absent other "defects," possibly oxygen vacancies, can cause further instability. Instability is characterized in the completed device by large variations in threshold voltage and poor negative gate stability both within an individual device and between devices formed during a common processing.

It is known to the art that surface states can be removed by annealing in an inert gas at an elevated temperature, but the present methods used are not wholly satisfactory and a fully stable device has not been realized. Present annealing methods and procedures have generally followed accepted metallurgical practices of passing the wafers through multiple anneal steps with the central step being at the highest temperature.

An object of this invention is the provision of a method for producing MOS devices having uniform and predictable threshold voltages with good negative gate stability. Another object is the provision of a more stable MOS device by an improved annealing after-oxidation procedure.

SUMMARY OF THE INVENTION

Broadly, an MOS device formed in accordance with this invention is subject to an annealing and quick quench operation between the oxidation and metallization steps. More specifically, the device is annealed at approximately 1,100° C. for a period of 1 to 4 hours followed by a rapid quench to room temperature. The quench procedure is facilitated by the combined use of a very light quartz boat upon which the devices are set during the annealing process and a quartz holder designed so that the boat can be rapidly drawn from the annealing ambient to the boat holder which stands at the room temperature ambient.

DESCRIPTION OF THE INVENTION

The method of this invention is practiced after the silicon slices have already been subjected to preliminary cleaning techniques. A typical cleaning procedure is to immerse the slices in buffered hydrofluoric acid for 10 seconds, rinse in running deionized water for 5 minutes, and blow dry with filtered dry nitrogen.

The cleaned slices are prepared for the succeeding oxidation procedure by being loaded onto a very low mass quartz boat, with each slice lain "flat" on the boat surface between quartz projections rising from the surface. The oxidation procedure may by any conventional process, for example inserting the loaded boat into the mouth of a furnace having a one liter/minute flow of $N_2$, then into a 350° C. zone for 3 minutes, then into a 650° C. zone for 1 minute, and then into a 1,100° C. hot zone wherein the furnace gas flow is changed to 1 liter/minute of oxygen. The oxidation proceeds for a time interval determined by the oxide thickness desired, e.g. a 1,500 A. oxide requires about 90 minutes.

At the end of this short oxidation period, the nitrogen gas flow is restored in the furnace, and in accordance with this invention the oxidized slices are annealed for 1 to 4 hours (preferably 2 hours) at the typical temperature of 1,100° C.

A quartz boat holder is then taken from a room temperature atmosphere and placed into the opening of the furnace. A quartz pulling rod is used to pull the loaded boat as rapidly as possible from the hot zone of the furnace into the boat holder, and the holder is immediately removed from the furnace mouth in one operation. The quenched slices can then be removed from the boat and placed on Teflon trays.

A feature of the invention is the above-described rapid quench of the slices. It has been established that devices which spend a minimal time passing from the annealing temperature zone to the furnace mouth have lower threshold voltages and better negative stability than those slices which were cooled through several steps. Since speed of removal of heat is a key element in this invention, it is evident that the material for the boat and holder on which the slices are placed should have as low a thermal mass as possible. The boat and holder should also be capable of withstanding high temperatures and be relatively sodium free. While quartz is the material in the preferred embodiment, other materials having the above properties may be used, e.g. silicon.

It was also found that a temperature gradient across the slices during cooling would have adverse effects on the threshold voltage. By laying the slices "flat" in the low mass boat between quartz projections, the slices will contact several of the enclosing projections so that there is no temperature gradient during the quenching. In an alternative embodiment, some of the advantages of this invention are obtained by seating the slices in depressions in the surface of a vertical boat. However since the slices contact the boat only on the lower edges, some temperature gradient may be present. The slices are removed in this case by rotating the boat, after exit from the furnace tube, over a heat sink causing the slices to be tipped onto the heat sink.

While an optimum anneal time of 2 hours is cited, times of from 1 to 4 hours have provided adequate results. For the example given with a 1,000 A. oxide on <111> silicon, the slices yielded threshold levels in the region of 3.0–3.75 volts with negative bias stability of the order of 0.2 volts. Anneal times of less than 1 hour result in high threshold voltages, and times substantially in excess of 4 hours damage the oxide.

What is claimed is:

1. A method of annealing MOS devices to provide predictable threshold voltages and enhanced stability comprising the steps of
   - oxidizing clean semiconductor slices carried on a boat having a high heat resistivity and low thermal mass in an oxygen atmosphere in a furnace at an elevated temperature,
   - annealing the slices in an inert atmosphere in said furnace at about said elevated temperature and;
   - quickly removing the boat and slices therein from the annealing environment to room temperature.

2. The method of claim 1 wherein said boat is withdrawn from the annealing environment and placed into a boat holder, said holder being at the room temperature.

3. The method of claim 2 wherein said boat and boat holder are composed of quartz.

4. The method of claim 3 wherein said slices lie flat on the surface of said quartz boat and are confined by projections rising from said surface.

5. The method of claim 1 wherein said slices are contained within depressions formed in the surface of a quartz boat and wherein said boat is removed to the lower temperature environment and rotated so as to tip the slices into a heat sink.